United States Patent
DeWitt, Jr. et al.

(10) Patent No.: US 7,293,164 B2
(45) Date of Patent: Nov. 6, 2007

(54) AUTONOMIC METHOD AND APPARATUS FOR COUNTING BRANCH INSTRUCTIONS TO GENERATE BRANCH STATISTICS MEANT TO IMPROVE BRANCH PREDICTIONS

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 10/757,237

(22) Filed: Jan. 14, 2004

(65) Prior Publication Data

US 2005/0154867 A1    Jul. 14, 2005

(51) Int. Cl.
*G06F 7/46*    (2006.01)
(52) U.S. Cl. .................. 712/240; 712/240; 712/239
(58) Field of Classification Search ............... 712/240, 712/239
See application file for complete search history.

(56) References Cited

U.S. PATENT DOCUMENTS

| | | | |
|---|---|---|---|
| 4,291,371 A | 9/1981 | Holtey ........................ 364/200 |
| 4,316,245 A | 2/1982 | Luu et al. | |
| 5,051,944 A * | 9/1991 | Fetterolf et al. .............. 714/47 |
| 5,103,394 A | 4/1992 | Blasciak ..................... 395/575 |
| 5,113,507 A | 5/1992 | Jaeckel | |
| 5,142,634 A * | 8/1992 | Fite et al. .................... 712/240 |
| 5,212,794 A | 5/1993 | Pettis et al. | |
| 5,394,529 A * | 2/1995 | Brown et al. ............... 712/240 |
| 5,581,778 A | 12/1996 | Chin et al. | |
| 5,659,679 A | 8/1997 | Alpert et al. | |
| 5,691,920 A | 11/1997 | Levine et al. .......... 364/551.01 |
| 5,752,062 A | 5/1998 | Gover et al. | |
| 5,768,500 A | 6/1998 | Agrawal et al. | |
| 5,774,724 A | 6/1998 | Heisch ....................... 395/704 |

(Continued)

FOREIGN PATENT DOCUMENTS

| | | |
|---|---|---|
| JP | 2000029731 | 12/1999 |
| JP | 2000347863 | 12/2000 |

OTHER PUBLICATIONS

Cohen et al., "Hardware-Assisted Characterization of NAS Benchmarks", Cluster Computing, vol. 4, No. 3, Jul. 2001, pp. 189-196.

(Continued)

*Primary Examiner*—Donald Sparks
*Assistant Examiner*—Vincent Lai
(74) *Attorney, Agent, or Firm*—Duke W. Yee; Herman Rodriguez; Francis Lammes

(57) ABSTRACT

A method, apparatus, and computer instructions for autonomically counting selected branch instructions executed in a processor to improve branch predictions. Counters are provided to count branch instructions that are executed in a processor to collect branch statistics. A set of branch statistics fields is allocated to associate with a branch instruction. When a program is executed, the stored statistics allows the program to look at the branch statistics in the counter to perform branch prediction. Hence, a user may use branch statistics values from the hardware counter to perform analysis on application code.

21 Claims, 3 Drawing Sheets

U.S. PATENT DOCUMENTS

| | | | | |
|---|---|---|---|---|
| 5,794,028 | A | 8/1998 | Tran | |
| 5,797,019 | A | 8/1998 | Levine et al. | |
| 5,930,508 | A | 7/1999 | Faraboschi et al. | 395/706 |
| 5,937,437 | A | 8/1999 | Roth et al. | 711/202 |
| 5,938,778 | A | 8/1999 | John, Jr. et al. | 714/45 |
| 5,940,618 | A | 8/1999 | Blandy et al. | |
| 5,950,003 | A | 9/1999 | Kaneshiro et al. | |
| 5,950,009 | A | 9/1999 | Bortnikov et al. | |
| 5,966,537 | A | 10/1999 | Ravichandran | 395/709 |
| 5,966,538 | A | 10/1999 | Granston et al. | |
| 5,987,250 | A | 11/1999 | Subrahmanyam | 395/704 |
| 6,006,033 | A | 12/1999 | Heisch | |
| 6,026,235 | A | 2/2000 | Shaughnessy | |
| 6,070,009 | A | 5/2000 | Dean et al. | 395/704 |
| 6,101,524 | A | 8/2000 | Choi et al. | 709/102 |
| 6,119,075 | A | 9/2000 | Dean et al. | |
| 6,134,676 | A | 10/2000 | VanHuben et al. | 714/39 |
| 6,189,141 | B1 | 2/2001 | Benitez et al. | 717/4 |
| 6,189,142 | B1 | 2/2001 | Johnston et al. | |
| 6,192,513 | B1 | 2/2001 | Subrahmanyam | 717/5 |
| 6,206,584 | B1 | 3/2001 | Hastings | 395/183.11 |
| 6,223,338 | B1 | 4/2001 | Smolders | 717/4 |
| 6,233,679 | B1 * | 5/2001 | Holmberg | 712/240 |
| 6,237,141 | B1 | 5/2001 | Holzle et al. | |
| 6,243,804 | B1 | 6/2001 | Cheng | 712/228 |
| 6,256,775 | B1 | 7/2001 | Flynn | 717/4 |
| 6,286,132 | B1 | 9/2001 | Tanaka et al. | 717/4 |
| 6,324,689 | B1 | 11/2001 | Lowney et al. | 717/9 |
| 6,330,662 | B1 | 12/2001 | Patel et al. | 712/236 |
| 6,351,844 | B1 | 2/2002 | Bala | 717/4 |
| 6,374,364 | B1 | 4/2002 | McElroy et al. | 714/10 |
| 6,430,741 | B1 | 8/2002 | Mattson, Jr. et al. | 717/154 |
| 6,442,585 | B1 | 8/2002 | Dean et al. | 709/108 |
| 6,446,029 | B1 | 9/2002 | Davidson et al. | 702/186 |
| 6,480,938 | B2 | 11/2002 | Vondran, Jr. | 711/125 |
| 6,505,292 | B1 | 1/2003 | Witt | |
| 6,542,985 | B1 | 4/2003 | Johnson et al. | |
| 6,549,998 | B1 | 4/2003 | Pekarich et al. | |
| 6,594,820 | B1 | 7/2003 | Ungar | |
| 6,631,514 | B1 | 10/2003 | Le | |
| 6,681,387 | B1 | 1/2004 | Hwu et al. | |
| 6,925,424 | B2 | 8/2005 | Jones et al. | |
| 6,961,925 | B2 | 11/2005 | Callahan, II et al. | |
| 7,181,723 | B2 | 2/2007 | Luk et al. | |
| 2001/0032305 | A1 | 10/2001 | Barry | 712/34 |
| 2002/0019976 | A1 | 2/2002 | Patel et al. | 717/137 |
| 2002/0073406 | A1 | 6/2002 | Gove | |
| 2002/0124237 | A1 | 9/2002 | Sprunt et al. | 717/127 |
| 2002/0129309 | A1 | 9/2002 | Floyd et al. | 714/724 |
| 2002/0147965 | A1 | 10/2002 | Swaine et al. | 717/124 |
| 2002/0157086 | A1 | 10/2002 | Lewis et al. | |
| 2002/0199179 | A1 | 12/2002 | Lavery et al. | 717/158 |
| 2003/0014741 | A1 | 1/2003 | Megiddo et al. | |
| 2003/0040955 | A1 | 2/2003 | Anaya et al. | |
| 2003/0066055 | A1 | 4/2003 | Spivey | |
| 2003/0101367 | A1 | 5/2003 | Bartfai et al. | |
| 2003/0131343 | A1 | 7/2003 | French et al. | |
| 2004/0194076 | A1 | 9/2004 | Comp et al. | |
| 2004/0268316 | A1 | 12/2004 | Fisher et al. | |

OTHER PUBLICATIONS

Talla et al., "Evaluating Signal Processing and Multimedia Applications on SIMD, VLIW and Super Scalar Architectures", International Conference on Computer Design, Austin, Sep. 17-20, 2000, pp. 163-172.

Talla et al., "Execution Characteristics of Multimedia Applications on a Pentium II Process r", IEEE International Performance, Computing, and Communications Conference, 19th, Phoenix, F b. 20-22, 2000, pp. 516-524.

IBM Research Disclosure Bulletin 444188, "Enable Debuggers as an Objective Performanc Measurement Tool for Software Development Cost Reduction", Apr. 2001, pp. 686-688.

U.S. Appl. No. 09/435,069, filed Nov. 4, 1999, Davidson et al., Method and Apparatus for Instruction Sampling for Performance Monitoring and Debug.

U.S. Appl. No. 08/538,071, filed Oct. 2, 1995, Gover et al., Method and System for Selecting and Distinguishing an Event Sequence using an Effective Address in a Pr cessing Syst m.

DeWitt, Jr. et al., Method and Apparatus for Counting Instruction Execution and Data Accesses, filed Sep. 30, 2003.

Levine et al., Method and Apparatus for Selectively Counting Instructions and Data Accesses, filed Sep. 30, 2003.

DeWitt, Jr. et al., Method and Apparatus for Generating Interrupts Upon Execution of Marked Instructions and Upon Access to Marked Memory Locations, filed Sep. 30, 2003.

DeWitt, Jr. et al., Method and Apparatus for Counting Data Accesses and Instruction Executions that Exceed a Threshold, filed Sep. 30, 2003.

DeWitt, Jr. et al., Method and Apparatus for Counting Execution of Specific Instructions and Accesses to Specific Data Locations, filed Sep. 30, 2003.

DeWitt, Jr. et al., Method and Apparatus for Debug Support for Individual Instructions and Memory Locations, filed Sep. 30, 2003.

Levine et al., Method and Apparatus to Autonomically Select Instructions for Selective Counting, filed Sep. 30, 2003.

Levine et al., Method and Apparatus to Autonomically Count Instruction Execution for Applications, filed Sep. 30, 2003.

Levine et al., Method and Apparatus to Autonomically Take an Exception on Specified Instructions, filed Sep. 30, 2003.

Levine et al., Method and Apparatus to Autonomically Profile Applications, filed Sep. 30, 2003.

DeWitt, Jr. et al., Method and Apparatus for Counting Instruction and Memory Location Ranges, filed Sep. 30, 2003.

DeWitt, Jr. et al., Autonomic Method and Apparatus for Hardware Assist for Patching Code.

DeWitt, Jr. et al., Autonomic Method and Apparatus for Local Program Code Reorganization Using Branch Count Per Instruction Hardware.

Wikipedia "JavaServer Pages" downloaded Jan. 24, 2006 http://en.wikipedia.org/wiki/JavaServer_Pages.

"Hardware Cycle Based memory Residency", IBM, May 22, 2003, ip.com, IPCOM000012728D, pp. 1-2.

Hyde, "The Art of Assembly Language", 2001, Linux Edition, pp. 247-248, retrieved Mar. 1, 2005 from http://webster.cs.ucr.edu/AoA/Linux/PDFs/0_PDFIndexLinux.html.

Ramirez et al., "The Effect of Code Reordering on Branch Prediction", Proceedings of the International Conference on Parallel Architectures and Compilation Techniques, Oct. 2000, pp. 189-198.

Yang et al., "Improving Performance by Branch Reordering", Proceedings of the ACM SIGPLAN 1998 Conference onProgramming Language Design and Implementation, Montreal Canada, 1008, pp. 130-141.

Conte et al., "Accurate and Practical Profile-Driven Compilation Using the Profile Buffer", Proceedings of the 29th Annual ACM/IEEE International Symposium on Microarchitecture, Paris, France, 1996, pp. 36-45.

Conte et al., "Using Branch Handling Hardware to Support Profile-Driven Optimization", Proceedings of the 27th Annual International Symposium on Microarchitecture, San Jose CA, 1994, pp. 12-21.

Fisher, "Trace Scheduling: A Technique for Global Microcode Compaction", IEEE Transactions on Computers, vol. C30, No. 7, Jul. 1981, pp. 478-490.

Chang et al., "Using Profile Information to Assist Classic Code Optimizations", Software Pract. Exper. 21, Dec. 1991, pp. 1301-1321.

Schmidt et al., "Profile-Directed Restructuring of Operating System Code", IBM Systems Journal, 1998, vol. 37, No. 2, pp. 270-297.

Aho et al., "Compilers: Principles, Techniques, and Tools", Addison-Wesley, 1988, pp. 488-497.

Intel, "Intel IA-64 Architecture Software Developer's Manual", Revision 1.1, vol. 4, No. 245320.002, Jul. 2001.

* cited by examiner

AUTONOMIC METHOD AND APPARATUS FOR COUNTING BRANCH INSTRUCTIONS TO GENERATE BRANCH STATISTICS MEANT TO IMPROVE BRANCH PREDICTIONS

CROSS REFERENCE TO RELATED APPLICATIONS

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/675,642, filed on Sep. 30, 2003; "Method and Apparatus to Autonomically Take an Exception on Specified Instructions", Ser. No. 10/675,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Autonomic Method and Apparatus for Hardware Assist for Patching Code", Ser. No. 10/757,171, filed on Jan. 14, 2004, and "Autonomic Method and Apparatus for Local Program Code Reorganization Using Branch Count Per Instruction Hardware", Ser. No. 10/757,156, filed on Sep. 30, 2003. All of the above related applications are assigned to the same assignee, and incorporated herein by reference.

BACKGROUND OF THE INVENTION

1. Technical Field

The present invention relates generally to an improved data processing system and, in particular, to a method and system for improving performance of the processor in a data processing system. Still more particularly, the present invention relates to a method, apparatus, and computer instructions for improving branch predictions by autonomically counting branch instructions executed in a processor.

2. Description of Related Art

In a pipelined processor system, instructions are often prefetched from memory to keep the pipeline busy. However, a branch instruction may cause a pipeline to stall. A branch instruction is an instruction that loads a new value in the program counter. As a result, the processor fetches and executes the instruction at this new address, instead of the instruction at the location that follows the branch instruction in sequential address order. A branch instruction may be conditional or unconditional. A conditional branch instruction causes an instruction to branch or jump to another location of code if a specified condition is satisfied. If the condition is not satisfied, the next instruction in sequential order is fetched and executed.

Branch instructions often cause the pipeline to stall because the branch condition may depend on the result of preceding instruction. The decision to branch cannot be made until the execution of that instruction has been completed. Therefore, a technique known as branch prediction is used to predict whether or not a particular branch will be taken. A speculative execution is performed to take advantage of branch prediction by executing the instruction before the processor is certain that they are in the correct execution path. Thus, if a branch is taken more than 90 percent of the time, it is predicted to be taken and executed by the processor prior to reaching the instruction.

Conventionally, branch prediction may be performed in two ways. One way is known as static branch prediction. This approach is performed by the compiler at compile time, which looks at the OP code word of the instruction to indicate whether this branch should be predicted as taken or not taken. The prediction result is the same every time a given branch instruction is encountered. Another approach of branch prediction is known as dynamic branch prediction, which is performed at run time, by keeping track of the result of the branch decision the last time that instruction was executed and assuming that the decision is likely to be the same this time. The prediction result may be different each time the instruction is encountered.

In order to perform dynamic branch prediction, several techniques have been introduced in the prior art. One of which is a branch prediction buffer, which utilizes a buffer or cache indexed by lower portion of the address of the branch instruction to indicate whether the branch was recently taken or not. However, this technique requires a special cache that would be accessed during fetching and flushed after the predictions are complete.

Another existing technique for performing dynamic branch prediction uses a branch target buffer, which is similar to a cache, except the value in the cache includes the address of the next instruction instead of the contents of the memory location. Also, the instruction itself may be stored instead of the address. This approach is known as branch folding. However, none of the currently existing techniques provide a solution for branch prediction at the instruction level, where detailed branch statistics are collected per branch instruction. In addition, none of the currently existing techniques provides a running history of branch prediction by associating branch statistic fields with branch instructions, so that better branch predictions may be performed by storing branch prediction values associated with each branch instruction in a dedicated memory location.

Therefore, it would be advantageous to have an improved method, apparatus and computer instructions for counting branch instructions to improve branch prediction, so that localized branch prediction may be performed at the instruction level during code execution and branch statistics may be collected later on to optimize performance of the system.

SUMMARY OF THE INVENTION

The present invention provides a method, apparatus, and computer instructions for improving branch predictions by autonomically counting branch instruction executed in a processor. In a preferred embodiment, selected pieces of code are identified for branch statistics, counters are used to count the number of times the identified branches are taken or not taken during program execution, and a set of branch statistics per branch instruction are derived based on the count. The branch count associated with the branch instruction is incremented when a branch is taken and decremented when a branch is not taken. Hence, the branch prediction field is updated. A running history of branch statistics is collected during program execution, which may help to improve branch predictions of a program. In addition, an application may switch hardware counter's mode of operation at run time to take a different set of branches for a given conditional branch instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention improves branch predictions by autonomically counting a selected set of branch instructions executed in a processor. In a preferred embodiment, counters are used to count the number of times branches are taken or not taken during program execution and a set of branch statistics per branch instruction are derived based on the count. The branch count associated with the branch instruction is incremented when a branch is taken and decremented when a branch is not taken. This information is used as data for predicting whether a branch will be taken, and the result of this prediction is located in a branch prediction field. Hence, the branch prediction field is updated according to data of the hardware counters. A running history of branch statistics is collected during program execution, which may help to improve branch predictions of a program. In addition, an application may switch a hardware counter's mode of operation at run time to take a different set of branches for a given conditional branch instruction.

Figure 1:
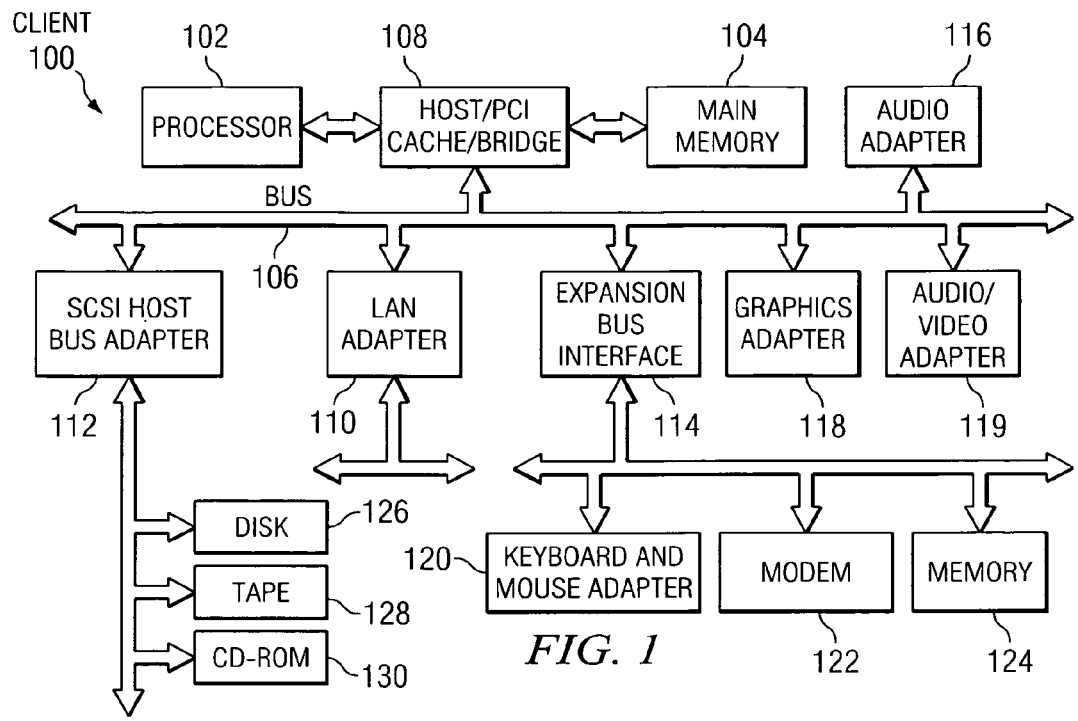
FIG. 1 is an exemplary block diagram of a data processing system in which the present invention may be implemented.

The present invention is preferably implemented on a computer system, such as a client or server in a client-server network environment. With reference now to FIG. 1, an exemplary block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
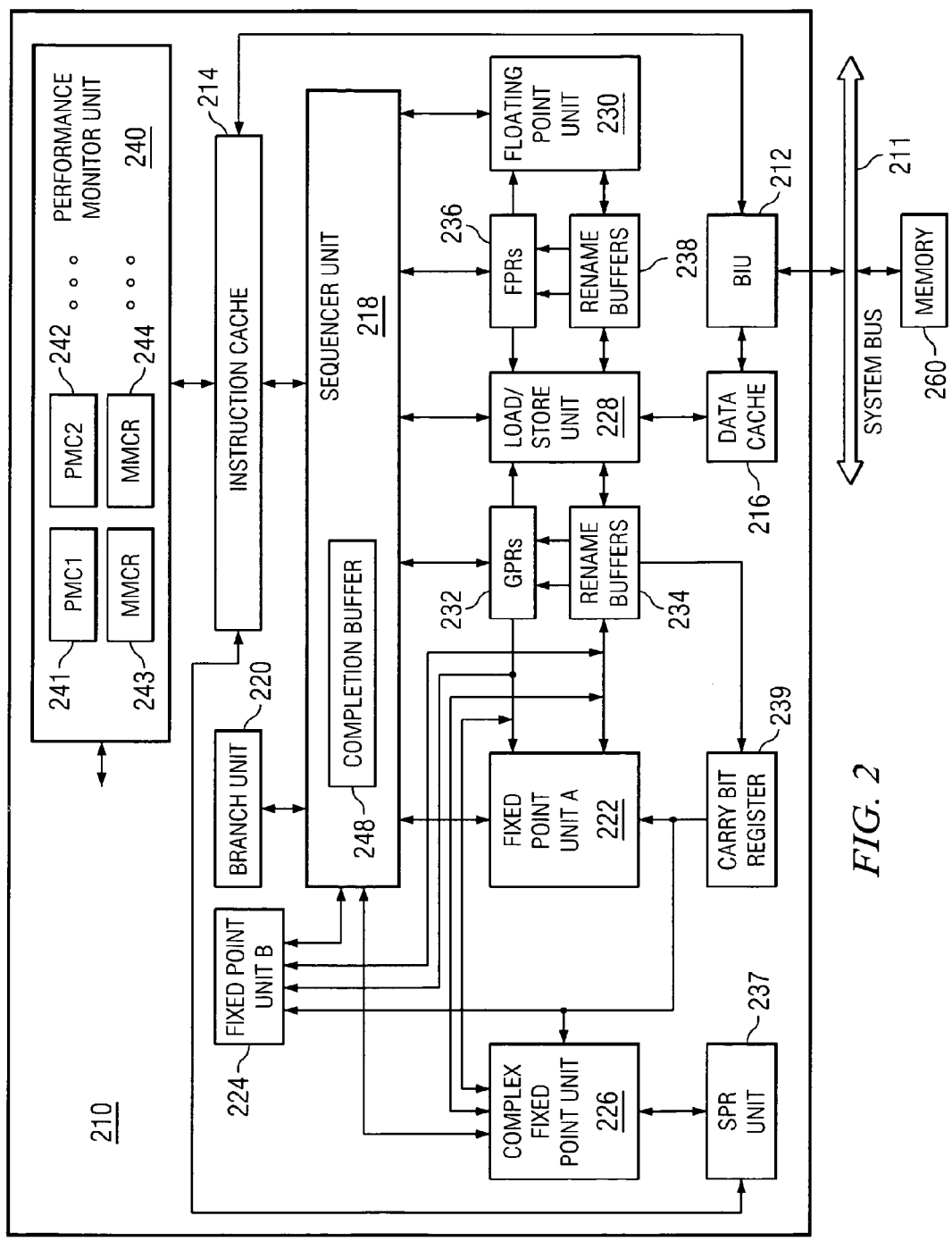
FIG. 2 is an exemplary block diagram of a processor system for processing information in accordance with a preferred embodiment of the present invention.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation. Counters 241-242 may also be used to collect branch statistics per instruction when a program is executed.

The present invention provides a method, apparatus, and computer instructions for autonomically counting branch instructions executed in a processor to improve branch prediction. In one embodiment, the mechanism of the present invention provides counters to count the number of times a branch is taken per branch instruction, in order to derive other branch statistics per branch instruction in the application code. A set of statistics is allocated to track branch statistics, such as the number of times a branch is taken, whether a branch was taken the last time the branch instruction was executed, and the branch prediction associated with the branch instruction.

Figure 3:
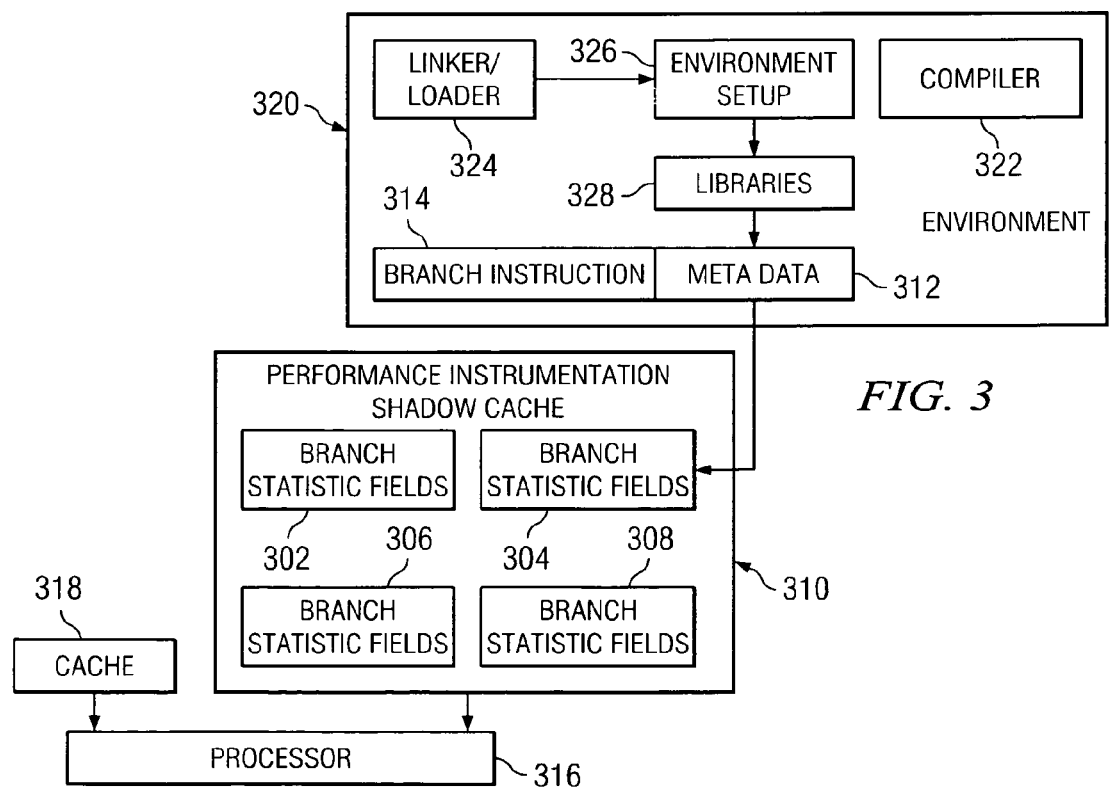
FIG. 3 is an exemplary diagram illustrating one mechanism of associating branch statistics with a branch instruction in accordance with a preferred embodiment of the present invention.

Turning next to FIG. 3, an exemplary diagram illustrating one mechanism of associating branch statistics with a branch instruction is depicted in accordance with a preferred embodiment of the present invention. A number of branch statistics 302-308 will be allocated by the loader in a performance instrumentation shadow cache 310. Each branch instruction is associated with a separate set of branch statistics. The performance instrumentation shadow cache 310 is a separate area of storage, which may be any storage device, such as, for example, a system memory, a flash memory, a cache, or a disk.

When the application code is compiled, meta data 312 is generated by a compiler 322 in an environment running on a client, such as environment 320. The meta data maps each branch instruction to corresponding branch statistics stored in the performance instrumentation shadow cache. For example, meta data 312 maps branch instruction 314 to branch statistics 304 allocated in performance instrumentation shadow cache 310. Branch statistics are discussed in further details in FIG. 4. When the processor 316 receives an instruction from cache 318, the processor 316 checks to see whether a meta data is associated with the instruction, in this case, branch instruction 314.

When the program is loaded, meta data 312 is prepared by the loader 324 so the meta data will be available to incorporate into performance instrumentation shadow cache 310 when branch instruction 314 is loaded into cache 318. Prior to executing the program, the link editor or linker/loader 324 allocates a work area, such as branch statistics 304, and notifies the processor of environment setup 326, which tells the processor to operate in a special mode. Environment setup 326 enables branch statistics 304 to be queried by the application at run time through the use of libraries 328. Libraries 328 are software modules that provide linkage between application programs and the allocated work area where the branch statistics are stored, such as branch statistics 304.

When code is executed in an application, the program may pause execution and examine the code for a branch instruction. The processor sees meta data 312 associated with branch instruction 314 and knows branch statistics 304 are stored in the performance instrumentation shadow cache 310. If the branch is taken, the branch unit, such as branch unit 220 in FIG. 2, notifies performance instrumentation shadow cache 310 of whether branch is taken or not taken in a form of a flag and the address of the branch instruction.

Performance instrumentation shadow cache 310 then notifies the hardware counter, such as PMC1 241 and PMC2 242 in FIG. 2, to increment the branch count of branch statistics 304 and update the branch field of branch statistics 304 to "taken". The branch count and the branch field are part of branch statistics 304 and is described further in FIG. 4. If a branch is not taken, performance instrumentation shadow cache 310 notifies the hardware counter to decrement branch count of branch statistics 304 and update branch field of branch statistics 304 to "not taken". The next time the same code is executed, the program pauses execution and examines the code again for branch instruction 314. Branch statistics 304 in performance instrumentation shadow cache 310 are then queried by the program to predict whether a branch is to be taken or not taken, preferably by comparing the branch count of branch statistics 304 to a threshold. Based on the result of the prediction, the program updates the branch prediction field of branch statistics 304 and prefetches branch instruction 314 if prediction indicates the branch is to be taken. The branch prediction field is part of branch statistics 304 and is described further in FIG. 4. This cycle continues to collect a history of branch statistics associated with each branch instruction.

Since the branch statistics collected are stored in the performance instrumentation shadow cache area 310, the program may refer to branch statistics 302-308 at any time to determine whether a branch instruction will be executed. In addition, branch statistics may be used to analyze the performance of the application code for future execution.

Furthermore, in another preferred embodiment, when applying branch statistics to a conditional branch, application software may instruct the hardware to change its mode of operation. For example, one mode may be "take the branch" and another mode may be "do not take the branch". The application software may have two separate sets of branch predictions, which may be used at run time to instruct the hardware to operate in a particular mode. This capability allows the application software to control the hardware counters, such as PMC1 241 and PMC2 242 in FIG. 2, by determining which hardware counter to use in one mode versus another mode. This implementation results in separate statistics and predictions for each branch, one set of predictions corresponding to a first mode, the other set corresponding to a second mode.

For example, the two modes might have different prediction results for a given branch. Certain events may occur that indicate one or the other of the predictions is likely to be correct (based on other information than only the statistics). In such a case, one of the modes, with the proper prediction for the branch, will be entered, determining that the branch is taken. In this way, various modes of operation, each with specific predictions that are predetermined for a given number of branches, can be entered when circumstances warrant.

The application software may switch modes of operation at run time by using an application programming interface (API). The API retrieves branch statistics information from the hardware counters using techniques described above. Application software may use this information to determine that a desired result will occur by calling a different subroutine to take a different path. For example, an application may have two pieces of code, one piece that works well with the branch taken and another one that works well with the branch not taken. By retrieving the information about the branch statistics, the application may update its code at run time to call a different subroutine based on the above information. Thus, the API allows application developers to develop applications by sharing knowledge from the hardware counters.

In another example, an application may have two hardware counters, such as PMC1 241 and PMC2 242 in FIG. 2, that collect two different sets of branch statistics. When the code is executed, a cache miss occurs and the application detects an internal state change that causes the application to tell the hardware which counter to switch to in order to choose a predetermined set of branches, based on the comparison of the counters with a threshold, for example. By using a different set of branch statistics provided by the counter, the application may call a different subroutine to execute a different set of branch instructions. The criteria of branch prediction may vary from counter to counter. One counter may predict a branch is to be taken with a branch count of 5 and another may predict a branch is to be taken with a branch count of 10. Branch predictions may differ from counter to counter based on the branch statistic.

Figure 4:
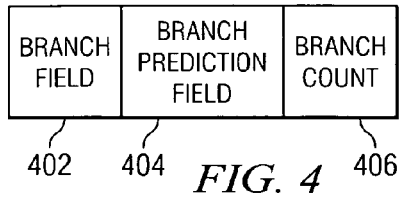
FIG. 4 an exemplary diagram illustrating example branch statistics is depicted in accordance with a preferred embodiment of the present invention

Turning next to FIG. 4, an exemplary diagram illustrating example branch statistics is depicted in accordance with a preferred embodiment of the present invention. In this illustrative example implementation, there are three branch statistic fields associated with each branch statistic: branch field 402, branch prediction field 404, and branch count field 406. These branch statistics fields are part of branch statistics, such as branch statistics 302-308, stored in a separate area of storage, such as performance instrumentation shadow cache 310 as described in FIG. 3. Branch field 402 indicates whether a branch is taken or not the last time the branch instruction, such as branch instruction 314 in FIG. 3, is executed. Branch prediction field 404 indicates the branch prediction made based on the branch count. There may be three values associated with the branch prediction field. A value of "00" indicates that no previous data is collected for branch instruction 314. A value of "01" indicates a branch is predicted to be taken for branch instruction 314, and a value of "02" indicates a branch is predicted to be not taken for branch instruction 314. Branch prediction is normally performed before the branch is executed. Branch count field 406 indicates the number of times a branch is taken when the code for that branch instruction is executed. Hardware counters increment or decrement this field based on whether a branch is taken or not when the code instruction is executed.

Figure 5:
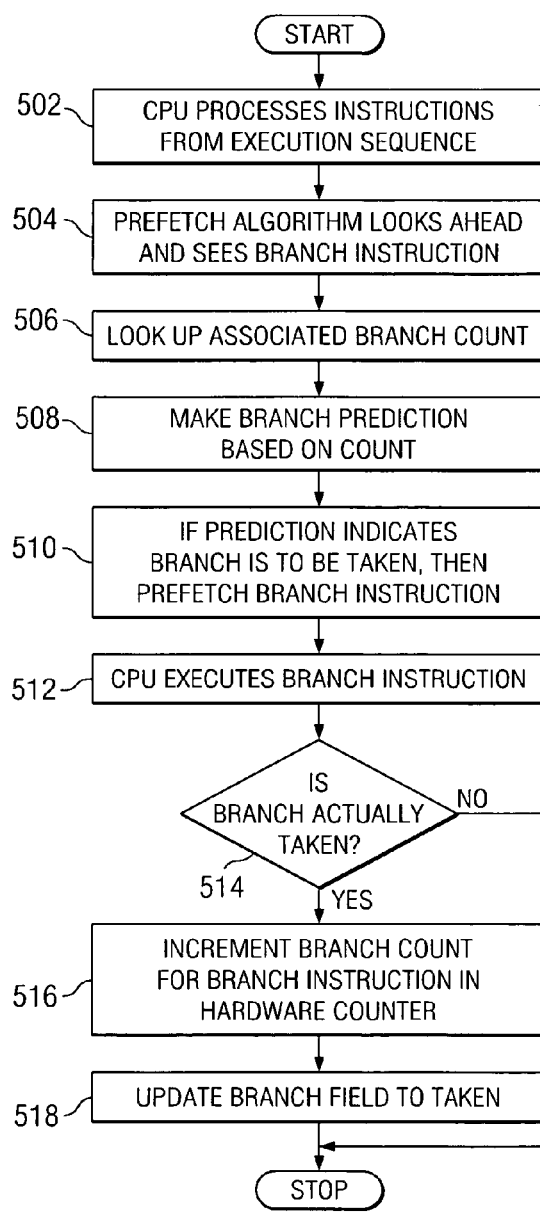
FIG. 5 is a flowchart outlining an exemplary process for counting branch instructions to improve branch predictions in accordance with a preferred embodiment of the present invention.

With reference to FIG. 5, a flowchart outlining an exemplary process for counting branch instructions to improve branch predictions is depicted in accordance with a preferred embodiment of the present invention. As depicted in FIG. 5, in a preferred embodiment, the process begins when the CPU processes instructions from an execution sequence when a program is executed (step 502). The prefetch algorithm of the CPU looks ahead and sees a branch instruction (step 504). The CPU then looks up the branch count associated with the branch instruction (step 506) and makes a branch prediction based on the branch count (step 508). For example, the branch count can be compared to a predetermined threshold to determine the prediction. If it is predicted that the branch is to be taken, the CPU prefetches the branch to instructions (step 510). When the CPU executes the branch instruction (step 512), a determination is made as to whether the branch predicted to be taken was actually taken or not taken (step 514). If the branch is actually taken, the branch unit notifies the cache unit address of the branch instruction and a flag indicating the branch is taken. The cache unit then increments the branch count associated with the instruction (step 516) and the branch field is updated to reflect a branch is taken last time the branch instruction is executed (step 518) and the process terminates thereafter.

If the branch is actually not taken from step 514, the branch unit notifies the cache unit of the address of the branch instruction and sets a flag indicating the branch is not taken. The cache unit then decrements the branch count associated with the instruction (step 520) and the branch field is updated to reflect a branch is not taken last time the branch instruction is executed (step 522) and the process terminates thereafter.

Figure 6:
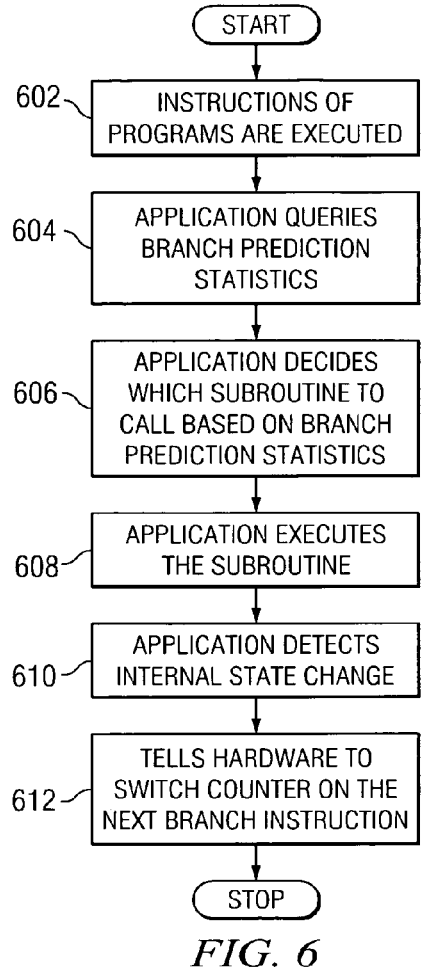
FIG. 6 is a flowchart outlining an exemplary process for switching modes of operation by application software in accordance with a preferred embodiment of the present invention.

Turning next to FIG. 6, a flowchart outlining an exemplary process for switching modes of operation of a conditional branch by application software is depicted in accordance with a preferred embodiment of the present invention. As depicted in FIG. 6, in a preferred embodiment, the process begins when instructions of a program are executed (step 602). The application software then queries branch prediction statistics collected by the hardware counters (step 604). Based on the values of the branch statistics (as determined from the branch counts collected), the application software decides which subroutine to call (step 606) and executes the subroutine (step 608). While the subroutine is executing, application software detects an internal state change that, according to previous information about the program, indicates that a different set of branches is most likely to be taken (step 610). An example internal state change may be a cache miss encountered during code execution, wherein the cache miss indicates that certain branches will later be taken. The application software then tells the hardware to switch counters on the next branch instruction (step 612) to collect a different set of branch statistics in order to make branch predictions that predict a different set of branches.

Thus, the present invention provides an improved method, apparatus, and computer instructions for branch predictions using hardware counters to autonomically collect more detailed branch statistics associated with a branch instruction of a program. The mechanism of the present invention allows branch predictions to be made at run time based on the running history of branch statistics stored in a performance instrumentation shadow cache, which is accessible by the application. This mechanism allows users to analyze application code autonomically during and after the code is executed.

Furthermore, using the innovative features of the present invention, application software may switch modes of operation of conditional branch at run time by toggling hardware counters. A different counter may have a different set of branch statistics that results in different branch predictions, which in turn causes a different set of branches to be chosen for a different mode of operation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing branch prediction in a computer program, comprising the steps of:
   identifying a plurality of branch instructions for application code being compiled;
   associating a plurality of hardware counters with the plurality of branch instructions;
   using the plurality of hardware counters to autonomically count all of the plurality of branch instructions that are executed in parallel to generate a plurality of branch statistics;
   predicting branches to be taken using the plurality of branch statistics to form branch predictions; and
   prefetching the plurality of branch instructions using the plurality of branch predictions.

2. The method of claim 1, wherein the plurality of branch instructions are associated with the plurality of branch statistics, and wherein the plurality of branch statistics are stored in a the plurality of branch statistic fields.

3. The method of claim 2, wherein the plurality of branch statistic fields store a plurality of data on an associated branch instruction, wherein a first datum of the plurality of data is accessed for branch prediction when the program is in a first mode, and wherein a second datum of the plurality of data is accessed for branch prediction when the program is in a second mode.

4. The method of claim 2, wherein the plurality of branch statistic fields include a branch count per instruction field that represents the number of times a branch is taken for that branch instruction.

5. The method of claim 1, wherein upon occurrence of a predetermined event, the computer program switches branch prediction operating modes on a conditional branch instruction.

6. The method of claim 1, wherein the plurality of branch statistics is stored in a performance instrumentation shadow cache.

7. The method of claim 1, wherein branches per instruction are counted during execution of the computer program.

8. A branch prediction apparatus, comprising:
   a compiler that identifies a plurality of branch instructions for application code being compiled;
   a plurality of hardware counters associated with the plurality of branch instructions of the application code;
   a plurality of branch statistic fields for storing a plurality of branch statistics associated with the plurality of branch instructions;
   wherein when a branch instruction in the plurality of branch instructions is executed in the application code, a hardware counter of the plurality of hardware counters autonomically counts all of the plurality of branch instructions that are executed and updates in parallel branch statistics in the plurality of branch statistic fields;

a processor that predicts branches to be taken using the plurality of branch statistics to form branch predictions; and the processor prefetches the plurality of branch instructions using branch predictions.

9. The apparatus of claim 8, wherein the plurality of branch statistics is used to make branch predictions in the application code.

10. The apparatus of claim 8, further comprising a plurality of operating modes of the application code, wherein for a first branch instruction, an associated branch statistics field stores first branch statistics for a first mode of the plurality of operating modes and second branch statistics for a second mode of the plurality of operating modes.

11. The apparatus of claim 8, wherein the plurality of branch statistic fields include a branch count per instruction field that represents the number of times a branch is taken for that branch instruction.

12. The apparatus of claim 8, wherein upon occurrence of a predetermined event, the program switches branch prediction operating modes on a conditional branch instruction.

13. The apparatus of claim 8, wherein the plurality of branch statistics is stored in a performance instrumentation shadow cache.

14. The apparatus of claim 8, wherein branches per instruction are counted during execution of the program.

15. A computer program product in a recordable-type computer readable medium, comprising:
   instructions for identifying a plurality of branch instructions for application code being compiled;
   instructions for associating a plurality of hardware counters with the plurality of branch instructions;
   instructions for autonomically counting all of the plurality of branch instructions that are executed in parallel using the plurality of hardware counters to thereby generate a plurality of branch statistics;
   instructions for predicting branches to be taken using the plurality of branch statistics to form branch predictions; and
   instructions for executing the application code using the branch predictions.

16. The computer program product of claim 15, wherein the plurality of branch instructions are associated with the plurality of branch statistics, and wherein the plurality of branch statistics are stored in a plurality of branch statistic fields.

17. The computer program product of claim 16, wherein the plurality of branch statistic fields store a plurality of data on an associated branch instruction, wherein a first datum of the plurality of data is accessed for branch prediction when the program is in a first mode, and wherein a second datum of the plurality of data is accessed for branch prediction when the program is in a second mode.

18. The computer program product of claim 16, wherein the plurality of branch statistic fields include a branch count per instruction field that represents the number of times a branch is taken for that branch instruction.

19. The computer program product of claim 15, wherein upon occurrence of a predetermined event, the computer program switches branch prediction operating modes on a conditional branch instruction.

20. The computer program product of claim 15, wherein the plurality of branch statistics is stored in a performance instrumentation shadow cache.

21. The computer program product of claim 15, wherein branches per instruction are counted during execution of the computer program.

* * * * *